(12) United States Patent
Heyde et al.

(10) Patent No.: US 10,639,819 B2
(45) Date of Patent: May 5, 2020

(54) METHOD FOR PRODUCING POLYOLEFIN RECYCLATES

(71) Applicant: DER GRUENE PUNKT—DUALES SYSTEM DEUTSCHLAND GMBH, Cologne (DE)

(72) Inventors: Michael Heyde, Bergisch Gladbach (DE); Ines Schwarz-Hilgenfeld, Cologne (DE); Stefan Wiethoff, Elsdorf (DE); Anna Ramsel, Cologne (DE); Nabila Rabanizada, Cologne (DE); Bryan-Cody Borchers, Heinsberg (DE)

(73) Assignee: DER GRÜNE PUNKT—DUALES SYSTEM DEUTSCHLAND GMBH, Köln (DE)

( * ) Notice: Subject to any disclaimer, the term of this patent is extended or adjusted under 35 U.S.C. 154(b) by 0 days.

(21) Appl. No.: 16/331,360

(22) PCT Filed: Sep. 7, 2017

(86) PCT No.: PCT/EP2017/072420
§ 371 (c)(1),
(2) Date: Mar. 7, 2019

(87) PCT Pub. No.: WO2018/046578
PCT Pub. Date: Mar. 15, 2018

(65) Prior Publication Data
US 2019/0193303 A1    Jun. 27, 2019

(30) Foreign Application Priority Data

Sep. 7, 2016  (DE) ...................... 10 2016 116 742

(51) Int. Cl.
| | |
|---|---|
| B29B 17/02 | (2006.01) |
| B29K 23/00 | (2006.01) |
| B29B 17/04 | (2006.01) |
| B29L 31/00 | (2006.01) |
| B29K 105/00 | (2006.01) |

(52) U.S. Cl.
CPC .......... *B29B 17/02* (2013.01); *B29B 17/0412* (2013.01); *B29B 2017/0203* (2013.01);
(Continued)

(58) Field of Classification Search
CPC ............ B29K 2023/00; B29K 2023/04; B29K 2023/065; B29K 2023/10; B29K 2023/12;
(Continued)

(56) References Cited

U.S. PATENT DOCUMENTS 5,248,041 A * 9/1993 Deiringer .................. B03B 1/04
                                                    209/11
5,538,142 A * 7/1996 Davis .................... B07C 5/3422
                                                    209/580

(Continued)

FOREIGN PATENT DOCUMENTS

| DE | 4332642 A1 | 3/1994 |
|---|---|---|
| DE | 69507832 T2 | 8/1999 |

(Continued)

OTHER PUBLICATIONS

WRAP ED—WRAP: "Scoping study into food gradepolypropylene recycling", Internet Citation, Nov. 30, 2010 (Nov. 30, 2010), pp. 1-79, XP002678334, retrieved from the Internet: URL:http://www.wrap.org.uk/sites/files/wrap/Scoping%20study%20into%20food%2Ograde%20polypropylene%20recyding %20-%20Report.pdf [retrieved on Jun. 21, 2012].

(Continued)

*Primary Examiner* — Terrell H Matthews
(74) *Attorney, Agent, or Firm* — Brooks Kushman P.C.

(57) ABSTRACT

The invention relates to a method for producing polyolefin recyclates, in particular HDPE recyclates. In a specified sequence, color-mixed polyolefin-containing groups are washed at a low temperature, washed at an increased temperature in an alkaline medium, flake-sorted, and treated at (Continued)

Figure 1:
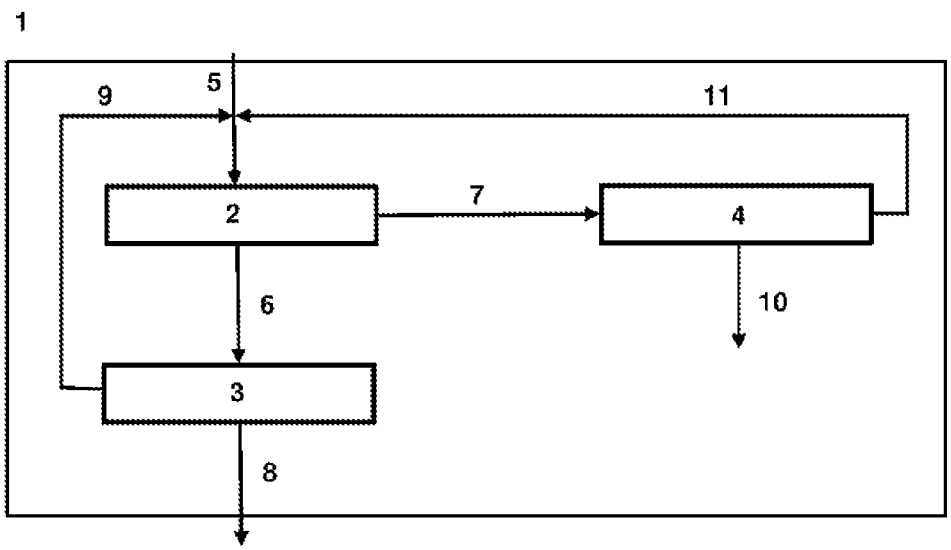

an increased temperature in order to remove migration materials. By virtue of the aforementioned method, polyolefin recyclates can be obtained with a substantially improved degree of purity compared to hitherto commercially available recyclates, said recyclates being usable in the production of novel consumer product packaging. Additionally, unpleasant odors connected to known polyolefin recyclates due to the decomposition products of migration materials formed during the extrusion process are largely prevented.

16 Claims, 1 Drawing Sheet

(52) U.S. Cl.
CPC .............. *B29B 2017/0279* (2013.01); *B29B 2017/0289* (2013.01); *B29K 2023/00* (2013.01); *B29K 2023/04* (2013.01); *B29K 2023/065* (2013.01); *B29K 2023/10* (2013.01); *B29K 2023/12* (2013.01); *B29K 2105/0032* (2013.01); *B29K 2995/002* (2013.01); *B29L 2031/712* (2013.01); *Y02W 30/622* (2015.05); *Y02W 30/625* (2015.05)

(58) Field of Classification Search
CPC ........ B29K 2105/0032; Y02W 30/622; Y02W 30/625; B29B 17/02; B29B 17/0412; B29B 17/0203; B29B 17/0279
USPC ........................................................ 209/12.1
See application file for complete search history.

(56) References Cited

U.S. PATENT DOCUMENTS

| | | | | |
|---|---|---|---|---|
| 5,542,982 | A * | 8/1996 | Terada | B29B 17/02 134/10 |
| 6,216,967 | B1 | 4/2001 | Hoberg et al. | |
| 6,845,869 | B1 * | 1/2005 | Graf von Deym | B03B 9/06 209/522 |
| 2005/0272913 | A1* | 12/2005 | Mauldin | C08J 11/08 528/480 |
| 2013/0186573 | A1* | 7/2013 | Kulesa | B02C 23/40 156/701 |
| 2014/0054204 | A1* | 2/2014 | Christel | B07C 5/36 209/587 |
| 2017/0001337 | A1* | 1/2017 | Hofmann | B29B 17/02 |

FOREIGN PATENT DOCUMENTS

| | | |
|---|---|---|
| DE | 10308500 | 9/2004 |
| DE | 102006016534 A1 | 10/2007 |
| DE | 102013114699 A1 | 6/2015 |
| EP | 1052021 A1 | 11/2000 |
| EP | 2700456 A1 | 2/2014 |
| EP | 2823945 A2 | 1/2015 |
| RU | 2169075 C2 | 6/2001 |
| WO | 2012/117250 A1 | 9/2012 |
| WO | 2012139967 A1 | 10/2012 |
| WO | 2013/057737 A2 | 4/2013 |
| WO | WO-2018124882 A1 * | 7/2018 ........... B07C 5/3416 |

OTHER PUBLICATIONS

ISR PCT/EP2017/072420, dated Nov. 8, 2017, 6 pages.
DE Office Action corresponding to DE 10 2016 116 742.8, dated Apr. 11, 2017.
Frank Welle: "Develop a food grade HDPE recycling process", WRAP, Jun. 4, 2005 (Jun. 4, 2005), XP055585397.
Buhler—Presentation Plastics Flake Sorting: "Plastics Flake Sorting", Oct. 16, 2013 (Oct. 16, 2013), pp. 1-20, XP055621987.
Wrap: "Food grade decontamination trials of household PP waste", Wrap Project IMT003-101, Jul. 2012 (Jul. 1, 2012), XP055621993.
Wrap: "Research & development to improve the recyclability of plastic milk bottles", Wrap Project MDP025-003, Jan. 2011 (Jan. 1, 2011), XP055621989.

* cited by examiner

METHOD FOR PRODUCING POLYOLEFIN RECYCLATES

CROSS-REFERENCE TO RELATED APPLICATION

This application is the U.S. national phase of PCT Application No. PCT/EP2017/072420 filed on Sep. 7, 2017, which claims priority to DE Patent Application No. 10 2016 116 742.8 filed on Sep. 7, 2016, the disclosures of which are incorporated in their entirety by reference herein.

DESCRIPTION

The present invention relates to an improved method for producing polyolefin recyclates and more particularly HDPE and PP recyclates.

BACKGROUND OF THE INVENTION

Polyolefins are robust, flexible plastics which, on the basis of their ease of processing and chemical resistance, have numerous possible uses and, with a proportion of about 45%, represent the largest individual group of consumer plastics in Europe.

By far the largest sector for use of polyolefinic plastics is that of packaging. The omnipresence of plastic packaging brings it again and again under the spotlight of environmental debate. Absent any suitable infrastructure for collecting, sorting, and reutilization, plastic packaging can become a problem, as is made clear by the debate on the contamination of the oceans. In varying scope and to varying extents, such infrastructures have been built up across Europe in the past 25 years, initiated by the EU Packaging Directive and by the corresponding national legislation. In Germany this infrastructure is constituted by the interception systems of the yellow bag/yellow bin type and by the associated approaches and plants for sorting and reutilization. The long-term viability of these infrastructures and their expansion to other countries are dependent quite essentially on the demand within industry for recycled plastics; the higher the quality of the recyclates made available, the better the evolution of this demand will be.

In the case of packaging made from PET, this is already being done today in a closed loop, with packaging plastics being used again in the next usage cycle to produce packaging. With polyolefins, a problem which arises is that, from standard recycling processes, polyolefins are processed in mixed colors, which recur in the recycled material as well. Consequently, depending on the composition of the starting material, the end products produced accordingly have various shades of gray. Because the recycling processes available to date also leave residual contaminants on the polyolefinic plastics, the processed products are subject to giving off typical recyclate odors, which rule out near-end-user applications. As a result, in the case of polyolefinic plastics, the applications available are predominantly now "open-loop" applications more remote from the end user; in other words, the recyclates, rather than being processed into packaging again, are instead processed into long-life plastics products from—for example—the construction sector.

A particular hindrance to the renewed use of polyolefin plastics are extraneous substances which are picked up in small amounts during the primary use of the polyolefins. For example, polyethylene packaging for a shampoo may pick up apolar ingredients such as fragrances from the shampoo, which thereafter cannot be removed simply by washing with water. If a polyolefin recyclate of this kind is exposed to high thermal loads, as is the case with extrusion operations, for example, these migrant substances undergo decomposition, this being a substantial source of the typical adverse recyclate odors.

Another hindrance, particularly affecting polyolefin packaging material, is that this material is not received as a starting material of relatively uniform color—in contrast, for example, to PET beverage packaging. Employing the sorting methods which have been customary to date, this leads to products in various shades of gray, as mentioned above.

An exception to this are specific collecting systems for uniform packaging, in the form of milk bottles, for example, which, like other beverage packaging, is collected separately in supermarkets in Great Britain, for example. The majority of polyolefin packaging, however, which often comprises not only different-colored polyolefin packaging but also a significant proportion of other plastics and extraneous substances such as metals, wood or paper, is sorted merely according to the type of material (e.g., "PE") and, as explained above, usually after having been comminuted and washed with cold water, is granulated and employed in consumer-remote applications at an earnings level which is usually well below the price for virgin product.

The long-term trend of rising raw-materials prices and also the pressure perceived within the consumer goods industry to adjust to a rising demand for sustainably produced products have given rise to a requirement for methods allowing polyolefinic packaging wastes, especially those from domestic households, to be processed for use again in packaging for end users. For this purpose, the method ought to provide an extremely cleansed recyclate product which can be sent for renewed extrusion, without generating byproducts afflicted by an unpleasant odor. Furthermore, the method ought to be able to be carried out with minimal complication, even at large throughput quantities, and inexpensively, to give a product which is competitive on the market. The present invention engages with this requirement.

SUMMARY OF THE INVENTION

The present invention in general discloses methods for producing polyolefin recyclates from mixed-color, polyolefin-containing wastes. The method disclosed is able more particularly to separate polyolefins from contaminating constituents which have become incorporated into the polyolefins as a result of migration events, although the method is also able to separate off contaminating constituents which adhere to the surface of the polyolefins or which are present in a mixture with the polyolefins.

Specifically, the present invention relates to a method for producing a polyolefin recyclate, suitable for producing consumer products, from mixed-color, polyolefin-containing wastes, which comprises the following steps:
(i) treating a mixed-color polyolefin waste fraction with water, without supplying thermal energy,
(ii) treating the polyolefin waste fraction obtained from (i) by washing with an alkaline medium at a temperature of at least 60° C.,
(iii) flake-sorting the polyolefin waste fraction obtained from (ii) to give one or more single-color polyolefin waste fractions, each comprising a polyolefin in concentrated form, where steps (ii) and (iii) may also be carried out in the opposite order, (iv) treating the single-color polyolefin waste fractions obtained from the preceding steps, at a temperature in the range from 50 to 155° C., preferably for a period of at least 60 minutes.

When it is indicated above that steps (ii) and (iii) can also be carried out in the opposite order, what this means is that in this case the water treatment (i), in the course of which no thermal energy is supplied, is followed by a flake-sorting operation on the polyolefin waste fraction obtained from the water treatment, to give one or more single-color polyolefin waste fractions, and this is followed by a treatment of the waste fraction by washing with an alkaline medium at a temperature of at least 60° C. The treatment described in (iv) is in this case positioned downstream of said washing.

The polyolefin waste fractions to be brought in as starting material for the method of the invention may be waste fractions of any suitable polyolefin and/or of mixtures of polyolefins. It is preferred, however, if the polyolefin waste fraction comprises a material which consists predominantly, i.e., to an extent of at least 75 wt %, preferably at least 80 wt %, and more preferably at least 90 wt %, of polyolefins of the same base polymer. Base polymers are considered to include homopolymers such as polypropylene or polyethylene, and also copolymers of ethylene and propylene with other α-olefin monomers. In the case of polyethylene, the known various modifications such as HDPE, LDPE or LLDPE are also to be considered respectively as independent base polymers. Polyolefins particularly preferred in the context of the present invention are polypropylene and modifications of polyethylene, more particularly in the form of LDPE and HDPE, preferably in the form of HDPE.

Raw material which can be utilized for the method comprises, usefully, waste fractions having undergone preliminary sorting by principal plastics constituent; these fractions may be obtained from conventional waste sorting plants. Presorted waste fractions of this kind are available as a commercial product in the form, for example, of pressed bales, and consist predominantly (about 90% to 95%, based on the plastics proportion) of one or more defined plastics base polymers (e.g., PP, HDPE or LDPE).

In the context of the method of the invention it is also possible to use separately collected wastes, such as milk bottles, for example. Because such separately collected wastes, however, generally have substantially more uniform soiling, the method of the invention is unable to play out its advantages to the full in the processing of such wastes. It is preferred accordingly if the waste fraction to be brought into the method of the invention at least comprises polyolefins of different colors. In the context of the present invention, colored polyolefin articles are regarded as including those which are transparent, white, and black, as well. With particular preference, the proportion of the waste fraction which makes up the main color of the waste fraction is not more than 80 wt %, more particularly not more than 60 wt %, and most preferably not more than 40 wt %. Furthermore, it may be preferable if the waste fraction to be brought into the method of the invention comprises transparent, white, and residual colored polyolefin articles, preferably with a proportion of about 10 to 60 wt % of transparent articles, about 10% to 60 wt % of white articles, and about 10 to 60 wt % of residual colored articles, and more preferably with a portion of about 20 to 45 wt % of transparent articles, about 20 to 45 wt % of white articles, and about 20 to 45 wt % of residual colored articles.

It is preferred, moreover, if the waste fraction includes packaging from different applications (e.g., shampoo packaging and food packaging), since waste fractions of this kind are contaminated with a broader spectrum of soiling, hence allowing the advantages of the method of the invention to be fully showcased.

In the first step (i), which may also be referred to as cold washing, the polyolefin waste fraction is washed with water in order to remove superficial contaminants from the polyolefins—in the form of food residuals, salts or paper labels, for example. For this purpose it is normally not necessary to heat or additize the water ahead of the washing procedure. The temperature at which this washing is carried out, given that no thermal energy is supplied, is dependent on the mechanical energy input and on the external temperature, and is frequently 30° C. or less. Depending on the degree of soiling and the soiling constituents that are present, however, the cold washing may in isolated cases be replaced by a mechanical dry washing, with the addition, for example, of abrasive constituents and the subsequent intensive agitation of the mixture. Contaminants can be detached from the surface of the polyolefin constituents in this way, through collisions. The abrasive constituents can be subsequently separated from the polyolefins again, with the aid, for example, of a float/sink process, in which the polyolefins float on the water by virtue of their density, while the abrasive constituents sink.

For the washing within step (i) it is useful if the starting material is subjected, before the cold washing, to one or more comminution steps. This makes sense especially when the starting material includes packaging with cavities, since in that case the comminuting ensures that the washing water is able to make contact with the entire surface of the packaging. The comminuting may usefully be carried out in a shredder, a cutting mill, or similar comminuting apparatus. Comminuting may take place either wet (i.e., with addition of water or moisture) or else dry. Furthermore, comminuting may also take place in a two-stage or multistage operation, especially a two-stage operation, with—preferably—the first stage being designed as a dry operation and the second stage as a wet operation.

The average particle size to be established by means of the comminuting ought to be not more than about 20 mm, more particularly not more than 15 mm, but preferably at least 2 mm, and more particularly at least 4 mm. A particularly favorable particle size is in the range from about 5 to 10 mm. Particle size here means the largest physical extent of the respective particles.

The size distribution of the particles may vary. Ideally, however, at least 80% (±10%) of the particles ought to have a particle size within the specified range.

It may make sense, furthermore, to subject the starting material, prior to the treatment in step (i), to a step of physical removal of loose contaminating constituents. Loose metal or glass constituents, for example, may be removed from the starting material by using magnets to extract magnetic metal constituents from the starting material, or by exploiting the greater specific weight of the contamination. Because polyolefins are lighter than glass or metals, the starting material can be conveyed, by means of a conveyor belt, for example, over a slot with dimensions such that the contaminants fall into the slot, while the lighter polyolefin constituents are conveyed away over the slot. Another possibility is to charge the stream of material from below with a stream of gas, which drives lighter constituents upward. Since the heavier constituents experience less uplift, they can be separated effectively from the lighter constituents by means of an apparatus of this kind. Lastly, in order to remove constituents of greater specific weight, it is also possible to use a float/sink process which exploits the fact that polyolefins are lighter than water. Within such a process, therefore, the polyolefin constituents are obtained as a fraction floating on the water, whereas constituents such as glass and metals sink in the water and can be separated off as a sediment.

For the above-specified separation to remove constituents of higher specific weight it is useful if this operation follows a comminution of the starting material, since by that means the starting material present is more uniform. Moreover, comminution as a preliminary has the advantage that the contaminants which can be removed include those which before the comminution are located within cavities of the polyolefin starting material.

It may further be useful if, before the comminuting, the starting material is roughly sorted by color and/or polymer; here, in particular, a rough division into transparent, white, and (residual) colored constituents and the types of polymer may be performed. "Rough" color sorting means that the starting materials are to be subdivided according to their principal color, with mixed-color consumer products being assigned to the color fraction corresponding to their principal color. Analogous comments apply in respect of the "rough" polymer sorting, being a sorting according to principal polymer. For example, HDPE bottles often carry PP caps; in this case, these bottles would be assigned to HDPE polymers.

To prevent entrainment of contaminated washing water, it makes sense to carry out mechanical dewatering of the polyolefin waste fraction obtained from step (i) as completely as possible before subjecting it to subsequent steps of the method.

In the second step (ii), also referred to as hot washing, the polyolefin waste fraction is treated at elevated temperature with an alkaline aqueous solution. In this step, firstly, residues of adhesive or printed labels adhering to the starting material are parted and removed, but also, secondly, residual contaminants not separable from the starting material within the cold washing are removed. The term "printed labels" refers, for example, to inks printed directly onto packaging such as drinks or shampoo bottles. For example, alcohol-free beverage bottles are frequently printed with epoxy-based inks. The alkaline treatment can additionally remove polymer coatings based on acrylates or ethylene-vinyl alcohol (e.g., EVOH films).

The step (ii) is carried out usefully at a temperature of at least 60° C., more particularly at least 70° C., and preferably in the range from 80 to 90° C., most preferably 80 to 85° C. Alternatively or additionally to this, it is preferred for step (ii) if the alkaline medium is an aqueous alkali metal hydroxide solution, more particularly an aqueous sodium or potassium hydroxide solution, and preferably an aqueous sodium hydroxide solution. The concentration of this solution in respect of sodium hydroxide ought not to exceed 10 wt %, since this generally imposes more exacting requirements on the apparatus in which step (ii) is carried out. It having emerged that the majority of contaminants can be removed even at relatively low sodium hydroxide contents, a concentration range of 0.5 to 5 wt % for the sodium hydroxide solution may be stated as being preferred. A more particularly preferred concentration range is 1 to 3 wt %.

After the step (ii) and before the subsequent step (iii) it makes sense to dry the waste fraction, which can be done using known drying methods. Examples of suitable drying apparatuses are, for example, fluidized bed driers, air circulation driers or adsorptive driers. Prior to the drying, moreover, it may be useful if the polyolefin waste fraction taken off from step (ii) is washed with water, in order to remove as far as possible the alkaline medium used in step (ii). This is especially the case if the alkaline medium includes inorganic constituents, which in the subsequent operating steps are removable only with substantial effort and complexity from the polyolefin waste fraction. Given that drying takes place with vaporization or evaporation of the water from the alkaline aqueous solution, it is useful, furthermore, to subject the waste fraction to mechanical dewatering before the drying, in order very largely to minimize the remanence and entrainment of constituents dissolved in the water.

After the drying outlined above, it may also make sense to subject the polyolefin waste fraction to a step of pneumatic classifying, in which label residues can be separated off. Pneumatic classifying is useful especially in the case of waste fractions which comprise printed or otherwise highly soiled labels or polymeric films. Because such labels or films are generally very thin by comparison with particles composed of plastic packaging, they can be separated off to a substantial proportion from the major constituents of the waste fraction by means of pneumatic classifying.

In step (iii) of the method of the invention, the polyolefin waste fraction is subjected to a flake-sorting procedure wherein the material is sorted chiefly according to color. Hence, within flake-sorting, particle mixtures may in particular be separated into colorless/transparent particles, white particles, and residual colored particles. It is, however, also possible, furthermore, to carry out more in-depth separation of the colored particles according to color.

The flake-sorting procedure is usefully designed to allow the removal as well of residual constituents of materials which do not correspond to the principal material of the waste fraction entering the flake-sorting procedure. Where, for example, the waste fraction comprises HDPE as principal constituent, it is possible in a corresponding flake-sorting procedure to separate off residues of polypropylene or other polyolefin plastics, and also any remnants of other plastics or nonplastics. It is possible, furthermore, especially for the purpose of recovery of transparent or white particles, to separate off particles printed or heavily contaminated therewith, in order thus to prevent unwanted discolorations on further processing of the particles.

The apparatus utilized for flake-sorting is preferably a sensor-assisted sorting system. Sensor-assisted sorting systems may consist of a belt section for separating out and calming the material, a detector or plurality of detectors, disposed above or below a conveyor belt or in the area where the material is delivered, and a nozzle strip with which the material component for positive sorting is discharged. Alternatively, the material can be distributed by way of vibrating chutes over steep slip channels, at the end of which, respectively, the particles are conveyed in freefall past the detectors.

The sorting of the particles, especially for the separation of particles composed of different materials, takes place usefully with utilization of NIR (near infrared) detectors. To separate particles with different colors, it is also possible to employ conventional color cameras. For the colored fractions, moreover, it may make sense to deploy a resorting step which ensures compliance with a defined color spectrum. In this case, by way of a detection unit, in standard operation, the color composition is first of all simply measured and compared with a color standard, without the particles being discharged. Only if the color composition deviates from the color standard over a tolerance range, which has to be specified, is sorting carried out, with particles of the respective excess color being discharged.

Suitable apparatuses for flake-sorting are sold, for example by Bühler GmbH under the SORTEX name, or by Steinert Global under the UniSort name.

As indicated above, mixed-color starting products can be brought into the method of the invention, if they have a relatively uniform color distribution. Hence it is possible to apply flake-sorting to a mixed-color starting product comprising, for example, 20 to 45 wt % of transparent, 20 to 45 wt % of white, and 20 to 45 wt % of residual colored constituents. Because conventional color sorters are optimized for separating, from a feed stream, relatively small proportions of incorrect colors (e.g., «5%), color sorters of this kind are unable regularly to achieve a color purity as required for acceptable product quality.

In the course of the investigations on which this patent application is based, it was found, surprisingly, that high color purity can be assured when using highly mixed-color starting materials by the serial connection of a plurality of color sorters. Accordingly, where the starting material includes substantial proportions (20 wt % or more, based on the total weight of the target polymer for sorting in the starting material) of constituents not corresponding to the principal color of the starting material (e.g., 20 wt % of residual color particles and 80 wt % of white particles), the use of two color sorters connected in series is useful in order to raise the color purity of the product obtained from the first color sorter to a sensible level. Where the starting material includes significant proportions (i.e., 10 wt % or more, based on the total weight of the target polymer to be sorted in the starting material) of white, transparent, and chromatic constituents, then it is preferred, moreover, if the flake-sorting procedure includes a first step in which white and transparent constituents are separated from residual colored constituents, and a subsequent second step in which the white constituents are separated from those which are transparent.

One problem with presently available color sorters is to calibrate them such that desired constituents remain in the product whereas unwanted constituents are discharged selectively from the mixture. Technically, color sorters cannot be set so as to obtain a product with high yield and with high purity (>95%) in one or even two or more serially connected color sorters. A certain degree of oversorting, i.e., the incorrect discharge of desired constituents along with the unwanted constituents, is technically unavoidable.

A particularly favorable separating outcome in the sense of a product with good color quality (i.e., a proportion of wrongly colored particles of preferably about 2% or less and more particularly about 1% or less) and high yield, can be achieved in accordance with the invention by means of a unit of three color sorters, in which the first color sorter separates a desired color component (e.g., white/transparent) from an unwanted color component (e.g., residual color). Because of the mis-sorting unavoidable in conventional color sorters, the fractions of desired and unwanted color component that are obtained from this color sorter still include significant residual portions of unwanted and desired color component, respectively. The fraction with predominantly desired color component is therefore passed to a second color sorter, which re-sorts the product obtained from the first color sorter, where it further increases the proportion of desired color component. Provided lastly in the unit is a third color sorter, to which the fraction with predominantly unwanted color component from the first color sorter is passed, and in which the proportion of the unwanted color component is further increased.

The accumulated unwanted color component obtained in the third color sorter can be subsequently passed, usefully, to a further unit, as described above, in which a further color component (e.g., red/yellow) is separated from it according to the same scheme. The fractions picked out that are obtained in the second and third color sorters, in contrast, each still include significant proportions of desired color fraction, and are therefore resupplied as starting material to the first color sorter. The accumulated unwanted color component obtained in the second color sorter is passed usefully, if the color component comprises a plurality of colors (e.g., white/transparent), to a further unit, as described above, in which a further color component (e.g., transparent) is separated off from this component.

If the starting material to be separated is a mixture of more than three different-colored constituents, such as, for example, a mixture of white/colorless/red/yellow/green/blue constituents, then the separation preferably comprises at least two units, as described above; in the first unit, one color pair, e.g., white/colorless, is separated from the residual colored constituents, and in the second unit the color pair is separated into the individual colored constituents. The removal of one color pair in the first unit (instead only of material of only one color) has the advantage that in the case of mixtures with an approximately equal distribution in terms of color, the amount of particles to be picked out and the amount of particles to be left in the mixture are more similar, allowing better volume management in the plant as a whole.

If the residual color constituents likewise include a plurality of colors, such as red/yellow/green/blue constituents, for example, then a further unit is usefully provided in which a further color pair, e.g., red/yellow constituents, can be separated off from the residual colored constituents (e.g., green/blue). In the case of mixtures with white/colorless/red/yellow/green/blue constituents, particular preference is given to the removal of 1. white/colorless, 2. red/yellow, and 3. green/blue constituents, in that order. With further preference, a further unit of three color sorters, as described above, is provided respectively for each of the resultant color pairs, and in this unit the color pairs are separated into the individual colored constituents.

The described units composed of color sorters, and arrangements of two or more of these units, offer the advantage over the hitherto available separation processes that it is possible to separate approximately equally distributed mixtures into a plurality of defined products with high purities. In the case of a comparable arrangement with only color sorters connected linearly in series, in contrast, either the losses in yield or the number of separating steps required would be very large, to the great detriment of the cost-effectiveness of the separation.

Besides the aforementioned units of color sorters, it is also possible for further individual color sorters to be incorporated into the process of cleansing the polyolefin waste fraction. Such color sorters may be used, for example, for a further reduction in the incorrect color constituents in the cleansed, single-color fractions, in order to improve product quality further.

After the flake-sorting in step (iii), the resulting polyolefin waste fractions are subjected in step (iv), as described above, to a treatment at a temperature in the range from 50 to 155° C., this treatment being carried out usefully for a period of at least 60 minutes. The aim of this treatment is to eliminate to a very substantial degree any pollutants, migration products and/or contaminants present in the polyolefin waste fraction that have diffused into the outermost layer of the container.

The parameters of the method are guided by the inertness and by the chemical and physical properties of the polymer in question. Thus it should be ensured that the treatment temperature is as far as possible higher than the glass transition temperature but lower than the melting temperature of the plastic being treated. This ensures that the chains of the molecules on the one hand have sufficient mobility in order to be able to release migrant substances but on the other hand not to melt or soften, which would lead to the individual particles amalgamating.

Suitable temperature ranges which can be specified for the most commonplace polyolefins—HDPE, LDPE, and polypropylene—are as follows:

HDPE: 50 to 130° C., preferably 90 to 122° C., most preferably 110 to 115° C.
LDPE: 50 to 110° C., preferably 75 to 105° C.
Polypropylene: 50 to 155° C., preferably 100 to 150° C.

The residence time is a factor which ensures a certain minimum cleaning of the material. The residence time is guided by various criteria, such as the diffusion rate of the migration products in the corresponding polymer and the softening/melting temperature of the polymer. As indicated above, for complete or near-complete removal of migration products, the residence time ought to be at least about 60 minutes. With preference the residence time is at least about 120 minutes, but ought not to exceed a residence time of about 600 minutes, since in the case of polyolefins, at residence times of more than 600 minutes, there is generally no further-improved removal of migrant substances observed. A residence time particularly suitable in the context of the invention may be specified as a period from about 180 to 360 minutes and more particularly 180 to 240 minutes.

The separation of migrant substances as part of step (iv) can be positively influenced by application of reduced pressure. The application of reduced pressure, moreover, is associated with the advantages that migrant substances can be removed via the reduced pressure from the apparatus in which the temperature treatment takes place, and that the plastics at the high temperatures are not exposed to an oxygen-containing atmosphere, in which there may be oxidative damage to the plastics. If the temperature treatment is carried out under reduced pressure, then for that purpose the pressure to be established is usefully ≤150 mbar, preferably ≤50 mbar, more particularly ≤20 mbar, and most preferably between 0.1 and 2 mbar.

Since oxidative damage can also be suppressed by carrying out the temperature treatment in an inert gas, the treatment in step (iv) may also be carried out in an inert gas atmosphere. The term "inert gas atmosphere" here does not necessarily mean that the inert gas must be present within the entirety of the apparatus. Instead it is sufficient if the inert gas is present in that region of the apparatus that directly surrounds the heated particles. Inert gases contemplated include, in particular, nitrogen and argon, of which, however, nitrogen is preferred for reasons of cost.

Apparatuses suitable for the temperature treatment are sold for example by Erema (AT) under the name VACUREMA.

Between the steps (iii) and (iv), the waste fraction obtained from step (iii) is usefully supplied to an extrusion apparatus for the purpose of producing polyolefin granules. This apparatus may be designed in such a way that the particles obtained from step (iii) merely undergo plastic deformation to form granules; however, it is also possible for additives, in the form of colorants or pigments, for example, to be supplied during the extrusion. In connection, for example, with polypropylene, moreover, adjuvants customary for compounding, such as peroxides or talc, may be supplied during the extrusion. Given that the extrusion of polypropylene into which such adjuvants have been incorporated is accompanied by odorous substances which may be perceived by the consumer as being unpleasant, it is of advantage in this case if the extrusion is carried out before step (iv), since in that step the odorous substances formed can at least partly be removed again. As a result it is possible in fact to reduce unpleasant odors by comparison with virgin polypropylene product that has been compounded with talc.

In the course of the extrusion, moreover, the material can be degassed and freed from volatile ingredients in the polyolefin melt by application of reduced pressure. Here, however, it should be borne in mind that such degassing cannot replace the temperature treatment in step (iv), since the degassing would have to be carried out for a period which does not allow economic operation of extrusion apparatus.

If the waste fraction obtained from step (iii) is supplied to an extrusion, then the extrusion apparatus is usefully arranged directly before the apparatus for the temperature treatment in step (iv), since the material there has already been heated. Because the temperature treatment is likewise carried out at an elevated temperature, therefore, with an arrangement of this kind, less energy is needed than if the material is initially cooled after the extrusion, before then having to be heated again to the temperature envisaged in the context of the temperature treatment. To avoid energy losses as a result of transport steps between extruder and treatment vessel, measures may be taken, such as, for example, transport installations, insulating systems, additional reduced pressure in the transfer region, etc.

In individual cases it is also possible to carry out extrusion to granules only after steps (iii) and (iv). A disadvantage of this, however, is that the waste fraction prior to granulation generally still includes small particles such as film fluff, which can be discharged under reduced pressure in the case of a temperature treatment. In the event of an operating regime of this kind, therefore, it would be vital to install filters which, moreover, would have to be cleaned at relatively short intervals. Moreover, prior to processing into granules, the polyolefin particles have a relatively high volume, which limits the throughput through the apparatus for the temperature treatment.

A further disadvantage of an extrusion downstream of step (iv) is that, owing to the thermal load on the material during the extrusion, substances may again be generated that lead to an unpleasant odor on the part of the product. Such substances can be reduced in the case of an extrusion prior to step (v) by way of step (iv); in the case of extrusion downstream of step (iv), in contrast, this is not possible.

The assumption ought really to be that processing to granules prior to the temperature treatment is detrimental to the product properties and to the temperature treatment time required. Hence, on the one hand, during the extrusion, decomposition products can be formed from migrant substances and are difficult to remove from the granules again; on the other hand, migrant substances are in general present on the surface of the particles and ought therefore to be more easily removable by the temperature treatment than migrant substances which have become distributed within the granular particles subsequent to the extrusion. Surprisingly, however, it has been observed that these effects have only minor consequences for the product, and are more than compensated by the advantages of granules for the temperature treatment. Furthermore, owing to their more compact structure, granules cool down less rapidly than the polymer material before the granulation, and so, in the case of the granules being passed directly into the temperature treatment in step (iv), the overall energy needed for the granulation and temperature treatment is less than in the case of the opposite regime.

In the course of the investigations on which the present invention is based, it was found that the quality of the resultant product is critically determined by steps (ii) and (iii) being carried out before step (iv), and by a granulating step, if included, taking place after the flake-sorting. It is also critical for the method that the hot washing is carried out before the temperature treatment.

As indicated above, the present invention also relates to a method wherein steps (ii) and (iii) are carried out in the opposite order. In this case, for example, the flake-sorting (iii) may be carried out before the hot washing (ii), the hot washing (ii) may be carried out before a granulation, and the granulation may be carried out before the temperature treatment (iv). The present invention in this embodiment likewise relates to a method wherein the flake-sorting (iii) is carried out before the hot washing (ii), the hot washing (ii) before the temperature treatment (iv), and the temperature treatment (iv) before a granulation. By comparison with the preceding method, however, the latter method is attended by the same disadvantages described above for a regime with temperature treatment (iv) before the granulation. For preferred embodiments of the hot washing, flake-sorting, temperature treatment, and granulation, the statements made above in relation to these procedures are valid analogously.

In respect of the sequence of the individual reaction steps, in one embodiment a regime with the sequence of hot washing (step ii), flake-sorting (step iii), granulation, and temperature treatment (step iv) is particularly preferred.

Without the applicant being able to rely on any particular theory in this regard, it is thought that polyolefin wastes from consumer products have contaminants, in the form of imprints, for example, which during the hot wash are first of all detached from the polyolefin particles. It is also possible for the polyolefin wastes to have labels made of other polyolefins, such as polypropylene, for example, which are detached from the main product in the course of the hot washing. Even if these labels are substantially removed from the thus-pretreated material by pneumatic classifying, small remnants of the labels can remain in the material. If this material is subsequently subjected directly to a thermal treatment, the residues may adhere again, particularly if the softening point or the glass transition temperature of the label material is below or in the region of the temperature at which the polyolefin wastes are treated in step (iv). Such adhering material might be more difficult to intercept in a downstream flake-sorting procedure, which would mean the resulting product being more highly contaminated than in the case of a procedure with the sequence of hot washing (step ii), flake-sorting (step iii), and temperature treatment (step iv).

In another embodiment, a regime of the sequence of flake-sorting (step iii), hot washing (step ii), granulation, and temperature treatment (step iv) is particularly preferred. This embodiment is attended by advantages especially when customers exist only for part of the products (e.g., white products but not residual colored or transparent products). Because the hot washing is associated with a relatively high energy expenditure, it may therefore make sense to reduce the amount of material to be cleansed by the hot washing, via the flake-sorting procedure, in order to carry out further cleansing only of that material, via the hot washing, for which there is a relevant market.

The method of the invention may be carried out batchwise or partially batchwise, by conducting all or some of the steps (i) to (iv) with individual batches of the polyolefin wastes. Since this is associated with a greater technical complexity and with empty times of individual apparatus constituents, however, it is preferred if the steps (i) to (iv) are carried out continuously.

A further aspect of the present invention relates to a polyolefin recyclate which is obtainable by the method outlined in the text above. This recyclate is preferably an LDPE, HPDE or polypropylene recyclate.

SHORT DESCRIPTION OF THE DRAWINGS

FIG. 1 describes a Unit 1 composed of three color sorters 2, 3, and 4. The unit is fed with polyolefin waste fraction via the feed line 5. In the first color sorter 2, the polyolefin waste fraction is separated into a desired color fraction 6 (e.g., white/transparent) and an unwanted color fraction 7 (e.g., a residual color). The desired color fraction 6 is then passed to the second color sorter 3, in which residual portions of the unwanted color fraction 9 are separated off from the mixture, and a further, cleansed desired color fraction 8 is generated. The unwanted color fraction 7 obtained in the first color sorter is passed to the third color sorter 4, in which residual portions of this desired color fraction 11 are generated from the mixture 7 to give a cleaned fraction of unwanted color fraction 10. The portions of desired color fraction 11 and unwanted color fraction 9 are subsequently passed back into the first color sorter 2.

Figure 2:
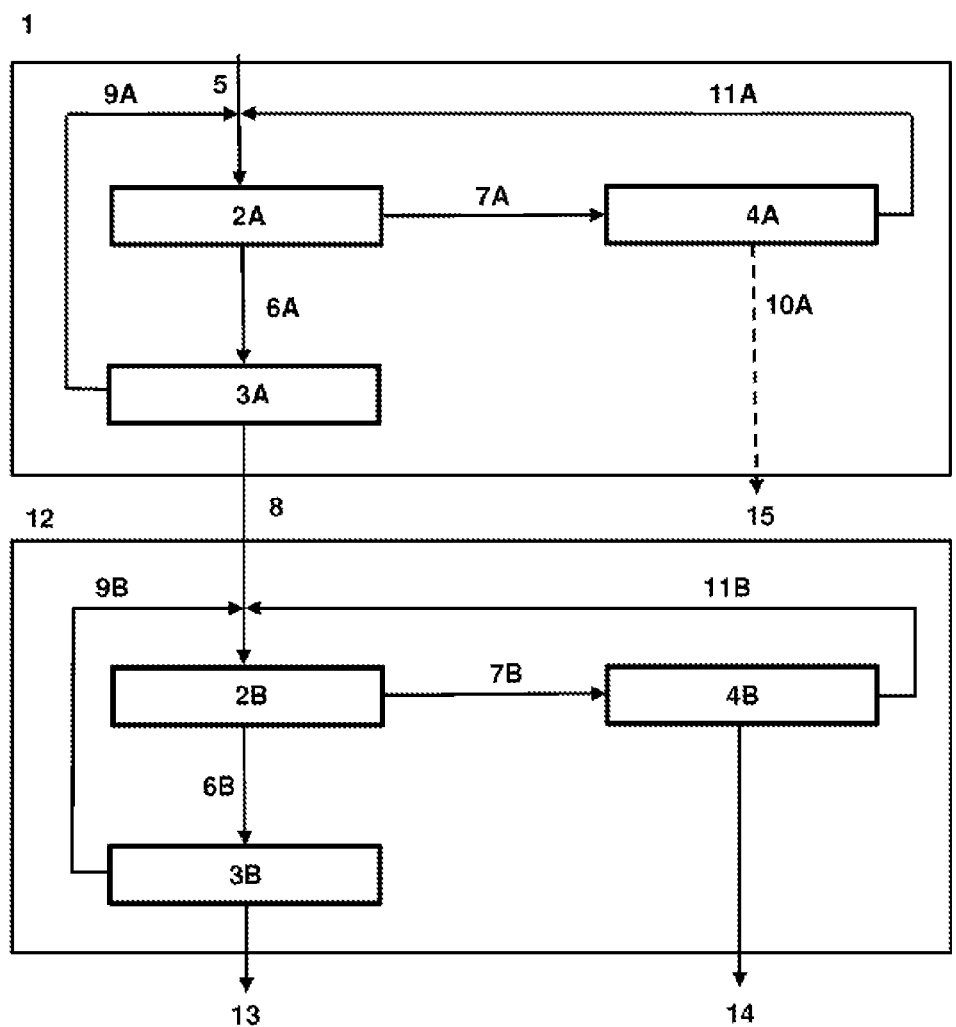

FIG. 2 describes a construction having two series-connected units 1 and 12; in the first unit 1 with three color sorters 2A, 3A, and 4A, one color pair (e.g., white/transparent) is separated off from the mixture of polyolefin waste fraction. The color pair obtained from the first unit is then fed via the feedline 8 into the second unit 12, in which the color pair is separated into the individual constituents (i.e., white on the one hand and transparent on the other). In this procedure, in analogy to the first unit 1, the color pair passes through three color sorters 2B, 3B, and 4B. The product obtained comprises the highly single-color individual constituents of the color pair 13 (e.g., transparent) and 14 (e.g., white). The cleansed residual fraction 10A generated in the third color sorter 4A of the first unit 1 is supplied to a further color sorter unit 15, where it is cleansed further; the construction of this unit is analogous to that of units 1 and 12.

EXAMPLE

Separation of a polyolefin waste mixture with a proportion of white/transparent and residual colored flakes of 34%, 34%, and 32%, respectively.

The specified mixture is supplied to a first unit 1 comprising three color sorters 2A, 3A, and 4A. In the first color sorter, residual color flakes are separated off from the mixture, to give a cleansed fraction of white/transparent flakes 6A with a white/transparent/residual colored distribution of about 47.5%/47.5%/5%. The mixture 7A picked out consists of white/transparent/residual colored flakes with a distribution of about 20%/20% and 60%. The cleansed white/transparent fraction 6A is passed to the second color sorter 3A, in which the fraction undergoes further cleansing. In this case, a clean fraction 8 with a distribution of about 49.5%/49.5%/1% of white/transparent/residual colored flakes is obtained. The secondary fraction 9A obtained in the second cleansing has a distribution of about 40%/40%/20% of white/transparent/residual colored flakes, and is passed back into the first color sorter 2A. The mixture 7A picked out from the first color sorter 2A is passed into the third color sorter 4A, where it is separated into a fraction of primarily residual colored flakes 10A (white/transparent/residual colored distribution 2.5%/2.5%/95%), and into a fraction 11A in which transparent and white flakes are accumulated (white/transparent/residual colored distribution 32.5%/32.5%/35%). This accumulated fraction 11A is likewise passed back into the first color sorter 2A.

The mixture 8 of transparent/white flakes obtained in the first unit is passed to a second separation unit 12 with three color sorters 2B, 3B, and 4B. In the first color sorter 2B, white flakes are separated from transparent flakes, giving a fraction 6B with accumulation in respect of transparent flakes (white/transparent/residual colored distribution 6%/93%/1%), and a fraction 7B accumulated in respect of white (white/transparent/residual colored distribution 66%/33%/1%). The fraction 6B accumulated in respect of transparent flakes is cleansed further in the second color sorter 3B to give a mixture 13 of 6%/93.5%/0.4% white/transparent/residual colored flakes, and a residual fraction 9B with a white/transparent/residual colored distribution of 6%/88%/6%.

The fraction 7B accumulated in respect of white flakes is supplied to a third color sorter 4B, in which a white color fraction 14 with a distribution of 95%/3.5%/1.5% white/transparent/residual colored flakes and a residual fraction 11B with a distribution of 39%/60.5%/0.5% white/transparent/residual colored flakes are generated. The residual fractions 9B and 11B from the second and third color sorters 3B and 4B are passed back into the first color sorter 2B of the second unit. As and when required, there may also be a further color sorter downstream of the color sorter 4B, in order, for example, to reduce the proportion of the residual colored flakes in the white color fraction to below 1%.

LIST OF REFERENCE SYMBOLS

1 first color sorter unit
2, 2A, 2B first color sorter
3, 3A, 3B second color sorter
4, 4A, 4B third color sorter
5 line feeding polyolefin waste fraction to first color sorter unit
6, 6A, 6B desired color fraction accumulated in first color sorter
7, 7A, 7B unwanted color fraction accumulated in first color sorter
8 desired color fraction cleansed in first color sorter unit
9, 9A, 9B unwanted color fraction accumulated in second color sorter
10, 10A unwanted color fraction accumulated in third color sorter
11, 11A, 11B desired color fraction accumulated in third color sorter
12 second color sorter unit
13 single-color individual constituent from 8
14 single-color individual constituent from 8
15 third color sorter unit

The invention claimed is:

1. A method for producing a polyolefin recyclate, suitable for production of consumer products, from mixed-color, polyolefin-containing wastes, comprising the steps of
   (i) treating a mixed-color polyolefin waste fraction with water, without supplying thermal energy,
   (ii) treating the polyolefin waste fraction obtained from (i) by washing with an alkaline medium at a temperature of at least 60° C.,
   (iii) flake-sorting the polyolefin waste fraction obtained from (ii) to give one or more single-color polyolefin waste fractions, each comprising a polyolefin in concentrated form, where steps (ii) and (iii) may also be carried out in the opposite order,
   (iv) treating the one or more single-color polyolefin waste fractions obtained from the preceding steps, at a temperature in the range from 50 to 155° C., preferably for a period of at least 60 minutes.

2. The method as claimed in claim 1, wherein the one or more single-color polyolefin waste fractions are supplied to an extrusion apparatus for producing polyolefin granules between steps (iii) and (iv) or after step (iv), preferably between steps (iii) and (iv).

3. The method as claimed in claim 1, wherein the proportion of the waste fraction accounting for the main color of the waste fraction is not more than 80 wt %, preferably not more than 60 wt %, and more preferably not more than 40 wt %.

4. The method as claimed in claim 3, wherein in the flake-sorting in step (iii), the polyolefin waste fraction is subjected to separation using a unit comprising three color sorters, where the polyolefin waste fraction is supplied to a first color sorter, in which a desired color component is separated off from an unwanted color component; the desired color component contained in the first color sorter is supplied to a second color sorter, in which the product obtained from the first color sorter is resorted, and the proportion of desired color component therein is increased further; and the unwanted component obtained in the first color sorter is supplied to a third color sorter, in which the proportion of the unwanted color component is increased further; and where the fractions picked out in the second and third color sorters are supplied again to the first color sorter as starting material.

5. The method as claimed in claim 4, wherein the flake-sorting in step (iii) incorporates a plurality of units comprising three color sorters.

6. The method as claimed in claim 4, wherein the polyolefin waste fraction comprises more than three colors and, via units (1, optionally 15) comprising three color sorters, respective color pairs are separated off from the polyolefin waste fraction, and the color pairs are separated into the corresponding color constituents in a respective downstream unit.

7. The method as claimed in claim 1, wherein the polyolefin is polyethylene or polypropylene, preferably HD-polyethylene.

8. The method as claimed in claim 1, wherein the treating of the polyolefin waste fraction in step (ii) takes place at a temperature of at least 70° C., preferably in the range from 80 to 90° C.

9. The method as claimed in claim 1, wherein the alkaline medium in step (ii) is aqueous sodium hydroxide solution with a concentration of less than 10 wt %, preferably with a concentration in the range from 0.5 to 5 wt %, and more particularly with a concentration in the range from 1 to 3 wt %.

10. The method as claimed in claim 1, wherein as part of the flake-sorting in step (iii), particles not consisting of polyolefin and particles having color deviations relative to the numerical majority of the particles in the polyolefin waste fraction are separated off.

11. The method as claimed in claim 1, wherein for the treating according to step (iv) a reduced pressure of ≤150 mbar, preferably ≤50 mbar, more particularly ≤20 mbar, and most preferably between 0.1 and 2 mbar is applied.

12. The method as claimed in claim 1, wherein the treating according to step (iv) is carried out in an inert gas atmosphere, preferably in a nitrogen atmosphere.

13. The method as claimed in claim 1, wherein the treating according to step (iv) is carried out for a period of 120 to 300 minutes and preferably 180 to 240 minutes.

14. The method as claimed in claim 1, wherein the polyolefin-containing wastes are subjected before step (i) to a preliminary sorting by color.

15. The method as claimed in claim 1, wherein the polyolefin waste fraction obtained from step (ii) is subjected to subsequent drying and to treatment in a pneumatic classifier.

16. A polyolefin recyclate obtainable by a method as claimed in claim 1.

* * * * *